Feb. 8, 1955 M. ARTZT 2,701,862

ELECTRIC WAVE FILTER

Filed Nov. 16, 1949 3 Sheets-Sheet 1

INVENTOR
Maurice Artzt
BY
[signature]
ATTORNEY

INVENTOR
Maurice Artzt
BY
ATTORNEY

INVENTOR
Maurice Artzt
BY
ATTORNEY

United States Patent Office 2,701,862

Patented Feb. 8, 1955

2,701,862

ELECTRIC WAVE FILTER

Maurice Artzt, Princeton, N. J., assignor to Radio Corporation of America, a corporation of Delaware Application November 16, 1949, Serial No. 127,741

10 Claims. (Cl. 333—74)

The present invention relates to electric wave filters and, more particularly, but not necessarily exclusively, to electric wave filters which are novel in form and which function as low pass, high pass or band pass filters. In one aspect of the invention, a single combination of two phase shifting or delay networks can serve either as a low pass or high pass filter by a change in polarity of the respective outputs of the networks. Because of this, a mere reversal of connections for one of the networks will change the combination from a high pass filter to a low pass filter.

In accordance with the invention a plurality of phase shifting or delay networks which comprise an impedance and a resistance are combined in such a manner that the sum of their separate phase-frequency characteristics provides cancellation in one or more portions of a given frequency spectrum and addition in another portion or other portions of the same spectrum. Cancellation and addition may be of voltages whereby a total response voltage is obtained which varies in any desired manner with respect to the frequency input range. For example, in a low pass filter, at low frequencies, the voltage response is to be maximum and at higher frequencies the voltage response is to be substantially zero. In the range between the lowest frequency to be passed and the cutoff point the voltage response may be flat or sloped. The phase shifting or delay networks which are referred to above, are disclosed and claimed in the copending application for Letters Patent of the United States filed November 16, 1949, identified by Serial No. 127,742, in the name of the present inventor and entitled Phase Shifting or Delay Networks, now Patent No. 2,641,645, issued on June 9, 1953.

The principal object of the present invention is to provide novel electric wave filters which obtain their attenuation characteristics by employing cancellation and addition of phase shifts occurring in a predetermined frequency spectrum.

Another object of the invention is to provide an electric wave filter having a plurality of phase shifting networks associated together to give a single output which is the sum of the several outputs, this sum representing a cancellation effect as well as arithmetical addition effect.

A further object of the invention is to provide a novel filter circuit which exhibits a change characteristic depending upon the adjustment of a single circuit element.

Other objects and advantages of the invention will, of course, become apparent and immediately suggest themselves to those skilled in the art to which the invention is directed from a reading of the following specification in connection with the accompanying drawings in which:

Fig. 1 shows, schematically, an electric wave filter embodying principles of this invention which functions as a high pass or low pass filter;

Fig. 2 of the drawing shows curves serving to illustrate the change of phase angle with frequency in the delay circuits included in Fig. 1;

Fig. 3 of the drawing shows curves serving to illustrate the filtering action of the filter of Fig. 1;

Fig. 4 of the drawing shows, schematically, another electric wave filter embodying the invention which will serve as an adjustable band pass filter;

Figs. 5 and 6 of the drawing show curves illustrating the filtering action of the filter of Fig. 4;

Figure 1:
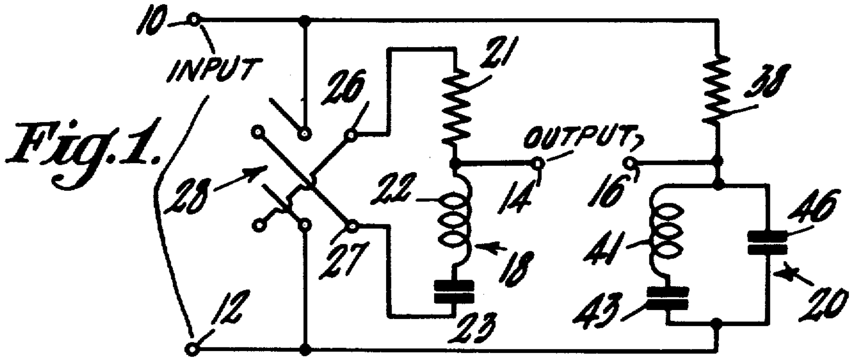

Fig. 1 of the drawing shows, schematically, an electric wave filter embodying the invention which is capable of serving as either a high pass or a low pass filter. The input terminals for the filter are designated 10 and 12. The filtered output of the filter network is to be taken from the terminals 14 and 16 as will appear hereinafter. One of these terminals for example the terminal 16, may be connected to the grid of a space discharge tube. In a typical output system the terminal 14 will be connected to a voltage reference point in the tube circuit such, for example, as ground.

The filter of Fig. 1 comprises two phase delay networks indicated generally by reference characters 18 and 20. As pointed out above, these phase delay networks and others which are capable of use in being combined to form an electric wave filter are disclosed and claimed in the above-identified patent application. The network shown illustratively herein will be described somewhat in detail for the sake of completeness of disclosure.

The network 18 comprises a resistor 21 which forms one of the arms of the first shifting network. The other arm is reactive and includes an inductance 22 and a condenser 23, which are connected in series. The terminals 26 and 27 of the network 18 are connected to the stationary contacts of a conventional reversing switch 28 which is shown illustratively as being of the double throw type. It will be understood that any suitable type of reversing switch may be used. The movable arms or contacts of the switch 28 are connected to the input terminals 10 and 12.

The network 20 comprises a resistance arm 38 and a parallel circuit combination comprising an inductance 41 in series with a condenser 43. This series circuit is connected in parallel with the condenser 46.

Figure 2:
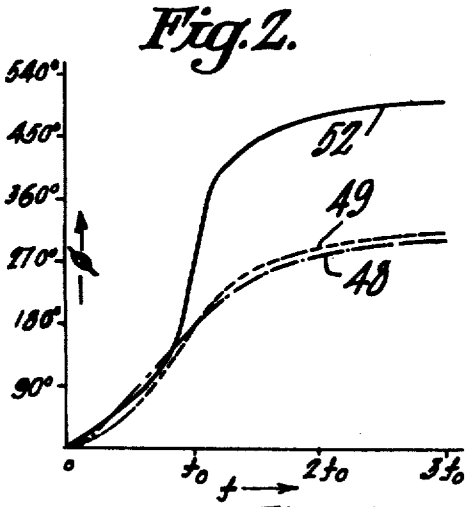

Fig. 2 of the drawing shows the phase-frequency curves of the networks 18 and 20 of Fig. 1. Superimposed curve 48 shows the phase angle plotted against frequency for the network 18. With a circuit of this type the phase delay $\phi$ in terms of frequency $f$ is given by $$\phi = -2 \tan^{-1}\left[\frac{fN}{1-f^2}\right]$$

where $f$ is the ratio of the actual frequency being plotted against $f_0$, the series resonant frequency of series circuit 18, 23. Thus when the frequency plotted is equal to the resonant frequency $f=1$. N is the ratio of R to $R_0$, R being the actual value of resistor 21 and $R_0$ being equal to the inductive reactance $X_L$ of inductance 18 at resonance which in turn is equal to the capacitive reactance $X_C$ of condenser 23 at resonance. At resonance, $R_0=X_L=X_C$. Line curve 49 is shown which is plotted in the same manner as the curve 48 referred to above. The expression for the phase angle $\phi$ is therefore plotted in Fig. 2 for two different values of the resistor 21 and therefore for two different values of N. The resistor 21 is considered to be equal to the inductive reactance of the inductance 22 and the capacity reactance of the condenser 23 when $N=1$. Other values of the factor N convert all of the data to a practical value suited to a particular problem or use of the network 21. In the illustrative examples, for curve 48, N is equal to 1.113. For the curve 49, N is equal to 0.93.

Curve 52 is a plot of phase delay $\phi$ against frequency $f$ for network 20. In connection with this network the phase angle is 180° at $f=1$ and 360° at $f^2=1+M$, where M is the ratio of the reactance of the bridging capacitor 46 to that of capacitor 43. For obtaining curve 52 the frequency $f_{0(41,43)}=0.913f_0$. In this case $f_{0(41,43)}$ is the tuning frequency of branch comprising the inductance 41 and condenser 43. The phase angle is 180° at $f=0.913$ rather than at $f=f_0$ as in the case of curves 48 and 49. It will be noted that the network 20 has two parameters designated M and N. The expression for phase delay $\phi$ of the network 20 is $$\phi=-2\tan^{-1}\left[\frac{Nf(1+M-f^2)}{M(1-f^2)}\right]$$

Upon closer examination of the phase-frequency curves of Fig. 2 it will be noted that up to the frequency $f=0.913$ networks 18 and 20 provide substantially the same phase delay and for all frequencies above $f=1.1$, the phase delays provided by the two networks are approximately 180° apart. When these two outputs are added the sum output will be substantially constant up to the cross over frequency, and will cancel for frequencies where they differ by 180°. A low pass filter in accordance with the invention is thus obtained. For a high pass filter, one of the networks, for example, the network 18, is reversed in polarity so that the two outputs are 180° apart below the cutoff frequency and cancel. Above cutoff the two voltages add. Reversal of polarity is obtained in the illustrative example, as pointed out above by the switch 28 which is shown for the sake of simplicity of disclosure.

Figure 3:
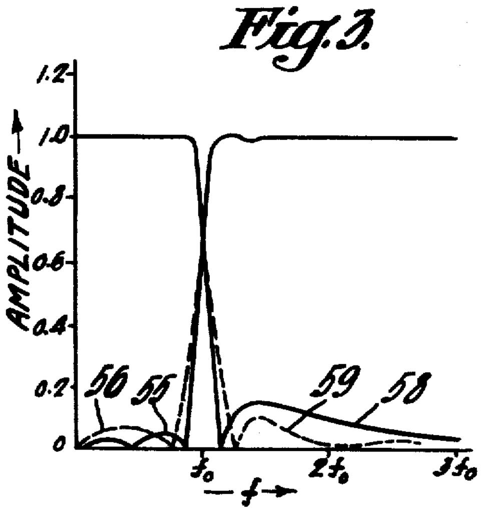

Fig. 3 shows the amplitude characteristics of the filters obtained from the phase curves of Fig. 2. Curve 55 shows a high pass filter characteristic which results from the curves 52 and 48 of Fig. 2. Curve 56 is obtained with curves 52 and 49. These curves show the amplitude response with the illustrative electric wave filter of Fig. 1, serving as a high pass filter. Curve 58 is obtained with the curves 52 and 48. Curve 59 is obtained with the curves 52 and 49. These are low pass filter curves. It is especially to be noted that the amplitude response with all of these curves is substantially flat and that the cutoff is sharp followed or preceded by a very slight and negligible response. With filters known to the prior art for example, the series M- derived filter, the amplitude response is not flat and the response following cutoff rises quite appreciably.

Slight readjustment of the value of the resistor 21 in the network 18 changes the cutoff characteristic, and also changes the frequencies "$f_\infty$" where complete cancellation occurs.

It will be noticed that the phase angle for the network 20 is made symmetrical about 270° for values of $f$ which are less than one compared to the reciprocals for values of $f$ greater than one. This is illustrated by the curve 52. Symmetry is accomplished by tuning 41—43 to a frequency of $f_0\sqrt[4]{1+M}$. In this case M is equal to 0.44, $\sqrt[4]{1+M}$ is equal to 1.0955 and $f_0$ for the curve 52 is equal to 0.913 multiplied by the tuning frequency of $f_0$ of the combination 41—43. The two angles are thus made 90° apart at the cutoff frequency $f_0$ and add to 0.707 of full value whether connected as a high pass filter or a low pass filter.

Figure 4:
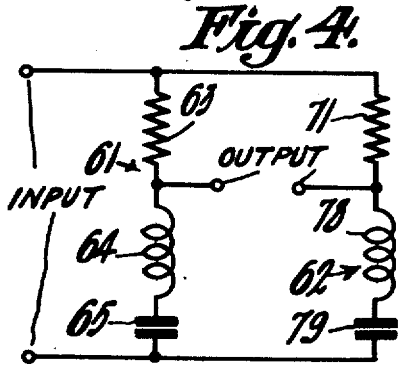
Figure 5:
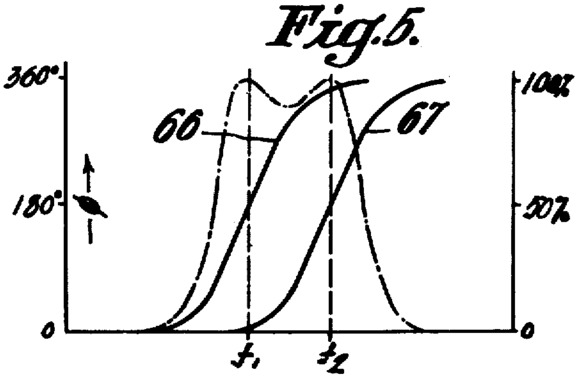
Figure 6:
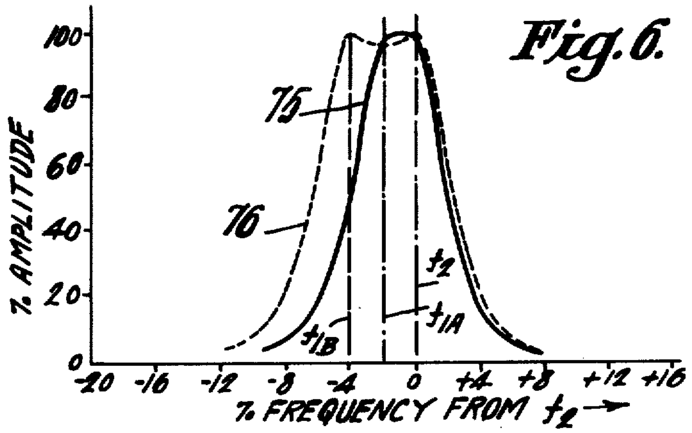
Figure 7:
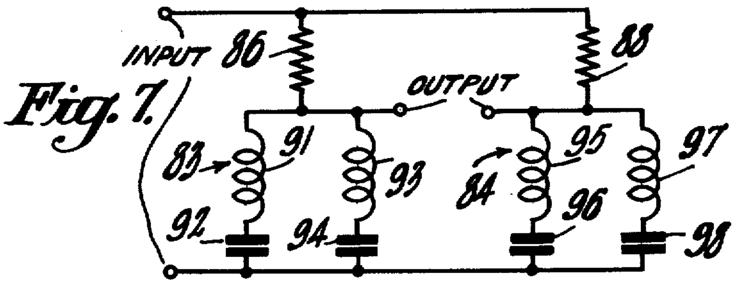
Fig. 7 shows, schematically, another filter network in accordance with the invention.

Figs. 4 and 7 of the drawing are illustrative of band pass filters constructed in accordance with the invention. In connection with both of these figures of the drawing, both networks have substantially the same total phase shift so that they start in phase at low frequencies and finish in phase at high frequencies above the desired high pass band. Fig. 4 shows an embodiment of the invention in which two networks 61 and 62 are tuned to frequencies $f_1$ and $f_2$ as shown by Fig. 5. These frequencies are the desired lower and upper cutoff frequencies. Each network, for example the network 61, comprises a resistor in one arm and an inductance and capacity in the other arm. These elements for the network 61 are labeled 63, 64, and 65 respectively. The condenser 65 is preferably adjustable as indicated on the drawing. The phase shift curves are designated 66 and 67, the curve 66 being the phase frequency response of the network 61. The resistor 63 of the network 61 and the resistor 71 of the resistor 62 are adjusted so that the two phase shift curves are parallel between these two frequencies and approximately 180° apart. With the band pass filter of this type constructed in accordance with the invention, the steepness of the two cutoff slopes will be determined by the value of the resistors 63 and 71. The smaller these resistors are the steeper the cutoffs will be. Where the cutoffs are steep the pass band is relatively narrow if a flat top curve is maintained. The width of the constant amplitude or flat top portion of the curve can be made up to about 5 per cent of the upper cutoff frequency without having an appreciable dip in amplitude at the center frequency, and at the same time maintaining a cutoff slope of 2 to 1 down in voltage for a 2 per cent change in frequency. Fig. 6 of the drawing shows two curves with the filter of this type obtained in practice. These curves are labeled 75 and 76. The band widths are 2 per cent and 4 per cent of $f_2$ which is the desired upper cutoff frequency. These curves indicate that the cutoff slope is not appreciably altered when the condenser 65 is changed between a value of 0.0052 $\mu$f. and 0.0054 $\mu$f. Solely by way of example the curves of Fig. 6 were obtained with the following constants in which the inductance and capacity in the second arm of the network 62 are designated 78 and 79. That is:

64=78=0.25 h.
79=0.005 $\mu$f.
65=0.0052 $\mu$f.
66=0.0054 $\mu$f.
$f_2$=4500 cycles
$f75$=4410 cycles
$f76$=4320 cycles
$N_1R_1=N_2R_2=100$ ohms $R_1$ and $R_2$ are values respectively of the resistor 63 and the resistor 71.

Fig. 7 shows an embodiment of the invention when wider band widths are required. In this arrangement there are two tuned circuits per network. Two tuned circuits thus form an arm of each network. In the illustrative example the networks are designated 80 and 83, and 84. The network 83 comprises a resistive arm 86. The network 84 comprises a resistive arm 88. The elements of the reactive arms are designated 91 to 98 as shown in the drawing for convenience of reference. When the branch 91—92 is stagger tuned with respect to the branch 93—94 and when the branch 95—96 is stagger tuned with respect to the branch 97—98 flat top band widths up to about 50 per cent of the upper cutoff may be obtained. Here the upper or lower cutoff may be made the steeper, by altering the resistance values as shown in the illustrative curves of Fig. 8. When the band is narrower than shown in the illustrative example of Fig. 8 sharper cutoffs will be obtained which is as in the example of Fig. 4. Three or more tuned circuits per arm of each network can be used to obtain wider bands or sharper cutoffs or both.

Figure 8:
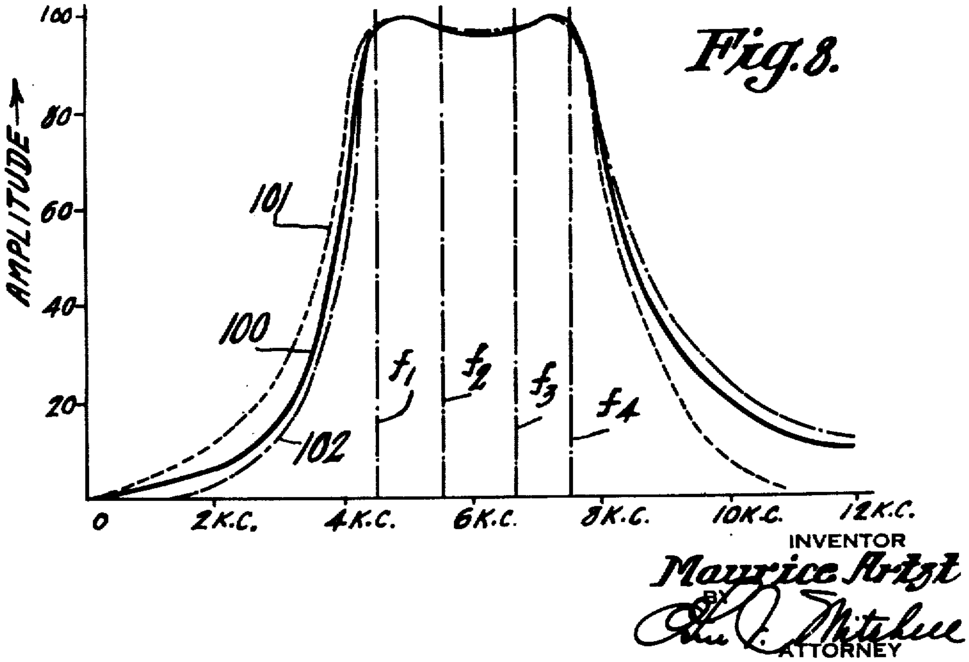
Fig. 8 is similar to Figs. 5 and 6 and shows the filtering action of the filter of Fig. 7.

With the curves of Fig. 8, curve 100 is obtained with the intermediate value of resistance for the resistor 86 and a relatively high value of resistance for the resistor 88. Curve 101 is made with a relatively low value of resistance for the resistor 86 and with the resistance 88 unchanged from the previous curve. Curve 102 is made with a relatively high value of resistance for the resistor 86 and a relatively low value of resistance for the resistor 88.

Figure 9:
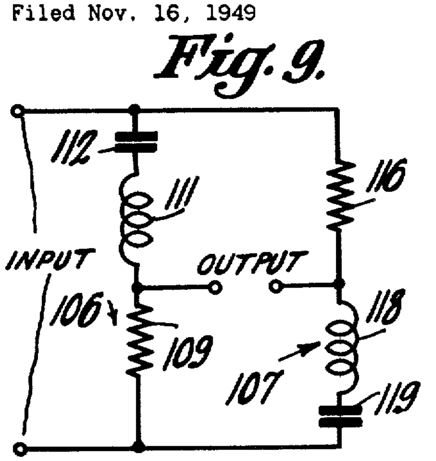
Fig. 9 is a schematic showing of a band rejection filter embodying the invention.
Figure 10:
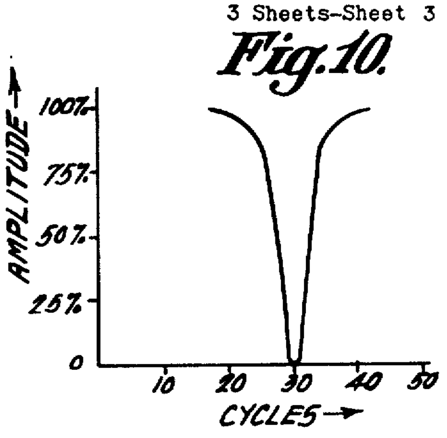
Fig. 10 shows an illustrative amplitude response curve of the filter of Fig. 9.

Fig. 9 of the drawing shows an arrangement in which one of the arms of the illustrative examples of Fig. 4 or 7 is reversed in phase so that a band rejection filter is obtained in accordance with the invention instead of a band pass filter as in the two previous examples which are named. This is illustrated in Figs. 9 and 10 of the drawing, Fig. 10 showing curves of the filter of this type. The filter of Fig. 9 comprises two networks 106 and 107. The network 106 has a resistive arm 109 and an arm comprising an inductance 111 and a condenser 112. The network 107 comprises a resistive arm 116 and a reactive arm comprising an inductance 118 and a condenser 119. For the curve shown in Fig. 10 the resistive arms 109 and 116 are substantially equal. In the illustrative example of Fig. 10 the two reactive arms are tuned at 29 and 31 cycles and the resistors 109 and 116 are adjusted for complete rejection at 30 cycles. The sharpness of cutoff obtained is clearly illustrated even though in the illustrative examples the Q values of the coils were low. In this example Q was equal to about 12 at 30 cycles. The width of the rejection band may be increased, at the expense of the sharpness of cutoff slope by tuning $f_1$ and $f_2$ further apart, and readjusting the resistors for rejection over the band desired. While Figs. 9 and 10 have been discussed in connection with illustrative values, it is understood that these are given solely by way of example and are not to be considered as restrictive but only by way of explanation.

Figure 11:
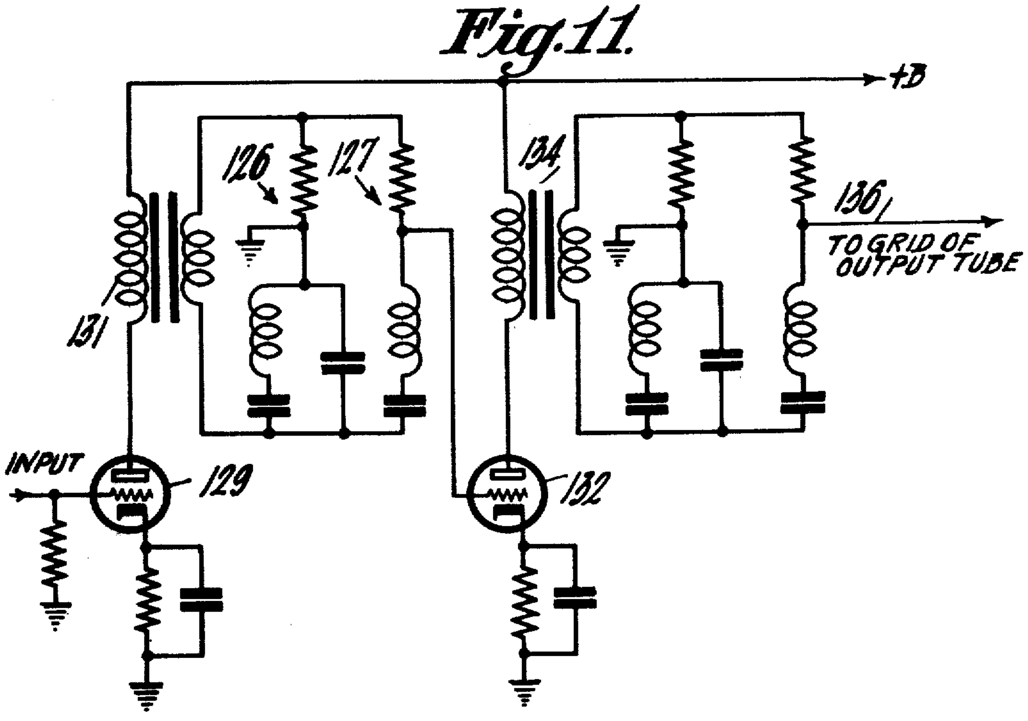
Fig. 11 shows a two stage high pass filter embodying the invention.

Fig. 11 of the drawing illustrates a two stage high pass filter constructed in accordance with the invention. Each stage comprises two networks which are or may be identical. The networks of the first stage are designated generally by reference characters 126 and 127. Inasmuch as each stage is constructed in accordance with teachings given above, it is believed to be unnecessary to give a detailed description at this point of the various elements of the networks 126 and 127. The input is coupled to the first stage by way of a space discharge tube 129 and an output transformer 131. The interstage coupling is obtained by a space discharge tube 132 and an output transformer 134. The output of the last stage appears on the connection 136 which may be connected or coupled to the grid of an output tube (not shown).

What is claimed is:

1. An electric wave filter comprising a pair of phase delay networks in parallel, means for applying an input electric wave across said parallel-connected networks, each of said networks comprising a series-connected resistance arm and reactive arm, the reactive arm of one of said networks consisting solely of an inductance and a condenser connected in series, whereby said one network provides a predetermined phase-shift to frequency characteristic over a band of frequencies extending from zero frequency to a given frequency, and the reactive arm of the other of said networks consisting solely of an inductance and condenser connected in series and a second condenser connected in shunt with said last-named inductance and condenser, whereby said other of said networks provides a phase-shift to frequency characteristic which is substantially the same as the phase-shift to frequency characteristic of said one of said networks over one portion of said frequency band and a phase-shift to frequency characteristic which is 180° out of phase in a given sense with that of said one of said networks over the remainder of said frequency band, and a pair of output terminals respectively connected to the junction between the resistance and reactance arm of each of said networks.

2. The combination claimed in claim 1, further comprising a reversing switch connected to reverse the connections of one of said networks with respect to the other, whereby with the said reversal of connections the pass frequencies and the rejection frequencies of the said filter are interchanged.

3. An electric wave band pass filter for a band of frequencies between a lower cutoff frequency $f_1$ and an upper cutoff frequency $f_2$ comprising a pair of input terminals, a pair of phase delay networks connected in parallel across said terminals, each of said networks comprising a series connected resistive arm and a reactive arm, each said reactive arm consisting of an inductance and a condenser connected in series, one of said arms being resonant at a frequency $f_1$ and the other of said arms at a frequency $f_2$, and a pair of output terminals, one at the junction of each resistive and reactive arm.

4. An electric wave band pass filter for a band of frequencies between a lower cutoff frequency $f_1$ and an upper cutoff frequency $f_2$ comprising a pair of input terminals, a pair of phase delay networks connected in parallel across said terminals, each of said networks comprising a resistance arm and a reactive arm, said reactive arm for each network comprising a parallel combination of elements, each element of the combination comprising an inductance and a condenser connected in series, one of said elements of one of said reactive arms being tuned to a frequency $f_1$ and one of said elements of the other of said reactive arms being tuned to a frequency $f_2$, and the remaining of said elements in said reactive arms being tuned to different frequencies intermediate frequencies $f_1$ and $f_2$, and a pair of output terminals, one for each network, respectively connected to the junction between the resistance and reactance arm of each network.

5. The filter claimed in claim 3, said resistive arms being connected at a junction to one of said input terminals and said reactive arms being connected at another junction to the other of said input terminals.

6. The filter claimed in claim 3, one said resistive arm of one said network being connected to one said reactive arm of the other said network at a junction connected to one of said input terminals, the other said resistive arm and the other said reactive arm being connected at a junction to the other said input terminal.

7. An electric wave filter comprising a pair of phase delay networks in parallel, one having a predetermined phase-shift to frequency characteristic over a given frequency band and the other having the same phase-shift to frequency characteristic as said one phase delay network over at least one portion of said given frequency band and a phase-shift to frequency characteristic which is 180° out of phase in a given sense with that of said one phase delay network over another portion of said given frequency band each of said networks comprising a resistance arm and a reactance arm, each said reactance arm comprising substantially pure reactances and having at least one resonant frequency, means to apply an input voltage across said parallel connected networks, and means including a pair of output terminals, one connected to the junction point of the reactance arm and resistance arm of each phase delay network, for deriving an output voltage from said wave filter.

8. The wave filter claimed in claim 7, each of said reactive arms having a series connected inductor and capacitor, and only one of said arms having a capacitor connected in shunt across said series connected capacitor and inductor.

9. The wave filter claimed in claim 7, each said reactive arm consisting of a series connected capacitor and inductor.

10. The wave filter claimed in claim 7, each said reactance arm comprising at least two parallel connected circuits each having a series connected capacitor and inductor.

References Cited in the file of this patent

UNITED STATES PATENTS

| | | |
|---|---|---|
| 1,644,004 | Zobel | Oct. 4, 1927 |
| 1,684,403 | Mason | Sept. 18, 1928 |
| 1,862,106 | Begin | June 7, 1932 |
| 1,890,543 | Holden | Dec. 13, 1932 |
| 1,946,274 | Chireix | Feb. 6, 1934 |
| 1,991,195 | Darlington | Feb. 12, 1935 |
| 2,228,869 | Chireix | Jan. 14, 1941 |
| 2,229,703 | Larson | Jan. 28, 1941 |
| 2,231,079 | Longo | Feb. 11, 1941 |
| 2,397,772 | Badmaieff | Apr. 2, 1946 |
| 2,463,436 | Sorvaag | Mar. 1, 1949 |

OTHER REFERENCES

Ser. No. 345,002, Nagai et al. (A. P. C.), published May 18, 1943.

UNITED STATES PATENT OFFICE

CERTIFICATE OF CORRECTION

Patent No. 2,701,862 February 8, 1955

Maurice Artzt

It is hereby certified that error appears in the printed specification of the above numbered patent requiring correction and that the said Letters Patent should read as corrected below.

Column 3, line 41, for '"$f_{c0}$"' read --"$f_{\infty}$"--; line 48, for

"$f_o \sqrt[4]{1+M}$" read -- $\dfrac{f_o}{\sqrt[4]{1+M}}$ --.

Signed and sealed this 22nd day of March, 1955.

(SEAL)

Attest:

E. J. MURRY

Attesting Officer

ROBERT C. WATSON

Commissioner of Patents